United States Patent [19]

Dausch et al.

[11] Patent Number: 5,447,469
[45] Date of Patent: Sep. 5, 1995

[54] INSTALLATION FOR HEATING, VENTILATING AND AIR CONDITIONING THE CABIN OF A MOTOR VEHICLE

[75] Inventors: Uwe Dausch, Maurepas; Jacques Danieau, Noisy Le Roi, both of France

[73] Assignee: Valeo Thermique Habitacle, Le Mesnil Saint-Denis, France

[21] Appl. No.: 310,256

[22] Filed: Sep. 21, 1994

[30] Foreign Application Priority Data

Sep. 23, 1993 [FR] France .................................. 93 11356

[51] Int. Cl.⁶ .............................................. B60H 1/32
[52] U.S. Cl. ........................................ 454/139; 165/42; 454/121
[58] Field of Search ............... 165/42; 454/99, 100, 454/121, 139, 140

[56] References Cited

U.S. PATENT DOCUMENTS 2,355,151  8/1944  Findley .......................... 454/121
4,874,036  10/1989 Masuda .......................... 165/42
5,222,372  6/1993  DeRees et al. .

FOREIGN PATENT DOCUMENTS 4013043  10/1991  Germany .

OTHER PUBLICATIONS

Patent Abstracts of Japan vol. 11, No. 123 and JP-A-61 263 822.
Patent Abstracts of Japan vol. 2, No. 075 and JP-A-51 141 140.

*Primary Examiner*—Harold Joyce
*Attorney, Agent, or Firm*—Morgan & Finnegan

[57] ABSTRACT

An installation for heating, ventilating and air conditioning the cabin of a motor vehicle of the kind in which the steeply inclined windshield forms in effect an upward and rearward extension of the motor hood, with the fascia panel being elongated longitudinally into the cabin of the vehicle, comprises a heating apparatus and a ventilating and air conditioning apparatus, both arranged in the central fascia panel. The ventilating and air conditioning apparatus has at least one upper air inlet port and at least one lower air inlet port, arranged in the fascia panel and directed upwardly and downwardly respectively. These ports are connected to the blower of the ventilating and air conditioning apparatus so as to supply the latter with recirculated air drawn from an upper zone and a lower zone, respectively, of the cabin.

12 Claims, 2 Drawing Sheets

INSTALLATION FOR HEATING, VENTILATING AND AIR CONDITIONING THE CABIN OF A MOTOR VEHICLE

FIELD OF THE INVENTION

This invention relates to an installation for heating, ventilating and air conditioning the cabin of a motor vehicle. More particularly, it relates to such an installation which comprises a heating apparatus together with a ventilating and air conditioning apparatus, both of which are contained within the fascia panel of the vehicle, and in which the ventilating and air conditioning apparatus includes a blower for delivering cold or conditioned air into the cabin through at least one air outlet port arranged on the fascia panel.

BACKGROUND OF THE INVENTION

An installation of the above type is described in the specification of French patent application No. 93 04273 filed on 9 Apr. 1993 in the name of Valeo Thermique Habitacle. In that installation, the heating apparatus also includes a blower for delivering heated air into the cabin via air outlet ports which are separate from the air outlet ports of the ventilating and air conditioning apparatus. In the installation disclosed in the above mentioned French patent application, the heating apparatus and the ventilating and air conditioning apparatus may be disposed in aligned relationship in a direction which is substantially horizontal with respect to longitudinal axis of the vehicle, the heating apparatus being arranged in front of the ventilating and air conditioning apparatus. In a modification, the heating apparatus and the ventilating and air conditioning apparatus may be arranged side by side. In either one of these arrangements, both apparatuses are disclosed in a central region of the fascia panel.

Such installations are most particularly suitable to vehicles of the "monobody" or "monocorps" type, in which the windshield is steeply inclined and forms, in effect, an upward and rearward extension of the motor hood, while the fascia panel is of a form in which it is very much elongated in a longitudinal direction into the cabin itself. Advantage can then be taken of this elongation of the fascia panel, so as to arrange centrally in it both the heating apparatus and the ventilating and air conditioning apparatus.

In such vehicles it has been found that under certain circumstances two hot air zones can form in the cabin, and that these zones are detrimental to satisfactory operation of the ventilating and air conditioning apparatus. One of these zones is above the panel and behind the windshield, and is created by solar radiation through the windshield. The air in this zone is heated to a greater extent the larger the windshield surface, and the more the windshield is inclined to the horizontal.

The other hot air zone lies in the lower part of the cabin, below the fascia panel and behind the motor compartment. This hot air zone is due essentially to heating of the air by heat radiated by the motor, which is arranged in a motor compartment lying immediately in front of the cabin of the vehicle.

These hot air zones are thus due mainly to the particular structure of the monobody type of vehicle, and the fascia panel acts as a screen between these two zones so that the air in each zone tends to become stagnant. Thus the existence of these two hot air zones is detrimental to good mixing of the air in the cabin of the vehicle.

DISCUSSION OF THE INVENTION

A main object of the invention is to overcome the above mentioned drawback.

To this end, the invention proposes an installation for heating, ventilating and air conditioning the cabin of a motor vehicle, comprising a heating apparatus and a ventilating and air conditioning apparatus both of which are contained within the fascia panel, the ventilating apparatus including a blower for delivering cold or conditioned air into the cabin through at least one air outlet port arranged on the fascia panel, characterised in that the ventilating and air conditioning apparatus includes at least one upper air inlet port which is open above the fascia panel and at least one lower air inlet port which is open below the fascia panel, these inlet ports being connected to the said blower so as to supply the latter with recirculated air, this air being drawn, respectively, from the above mentioned upper zone of the vehicle lying above the fascia panel and behind the windshield, and from the above mentioned lower zone of the cabin lying below the fascia panel and behind the motor compartment.

The stagnant air in the two zones described above may also be aspirated by the blower through the above mentioned air inlet ports, in order to be subsequently delivered into the cabin through air vents arranged on the fascia panel. This air may be treated, or not, by the evaporator which is part of the ventilating and air conditioning apparatus, before being distributed into the cabin.

In every case, improved mixing of the air in the cabin of the vehicle is obtained without stagnant zones of air being produced.

In one preferred embodiment of the invention, the or each upper air inlet port is connected to the blower through a duct, and similarly the or each lower air inlet port is connected to the blower through a duct. The air is thus properly channeled to the blower.

In a first embodiment of the invention, the upper air inlet port and the lower air inlet port are in permanent communication with the blower. This results in the otherwise stagnant air in the above mentioned upper and lower zones in the cabin being permanently aspirated by the blower of the ventilating and air conditioning apparatus.

In a more developed embodiment, the or each upper air inlet port is controlled by a flap valve, and the or each lower air inlet port is also controlled by a flap valve, but a different one. This enables selection to be made as to whether, or to what extent, air from the two zones is aspirated by the blower.

It is advantageous to arrange that the control flap valves for the upper and lower air inlet ports are synchronised with each other so that these ports are in an open condition at the same time, or in a closed position at the same time.

In this second embodiment of the invention, the ventilating and air conditioning apparatus further, and preferably, includes a flap valve controlling a recirculated air inlet, for supplying the blower with recirculated air drawn from the cabin. This recirculated air inlet flap valve is preferably arranged in the bottom of the fascia panel.

According to another preferred feature of the invention, the recirculated air inlet flap valve is synchronised with the flap valves which control the upper and lower air inlet ports, in such a way as to be closed when the upper and lower air inlet ports are open, and open when these upper and lower ports are closed.

According to a further preferred feature of the invention, the air outlet ports connected to the blower of the ventilating and air conditioning apparatus include: at least one frontally directed air vent; at least one port open in the upper part of the fascia panel; and at least one port open in the lower part of the fascia panel. The said ports which are open in the upper and lower parts of the fascia panel are preferably controlled by their own flap valves. According to yet another preferred feature of the invention, the heating apparatus includes a cold or recirculated air inlet, a further air blower, and air outlet ports which are separate from the air outlet ports of the ventilating and air conditioning apparatus.

In one preferred embodiment of the invention, the heating apparatus and the ventilating and air conditioning apparatus are oriented in a direction which is substantially horizontal with reference to the longitudinal axis of the vehicle, the heating apparatus being situated towards the front of the vehicle, i.e. in front of the ventilating and air conditioning apparatus.

Further features of the invention will appear more clearly on a reading of the detailed description of preferred embodiments of the invention which follows, and which is given by way of example only and with reference to the accompanying drawings.

DESCRIPTION OF PREFERRED EMBODIMENTS OF THE INVENTION

Figure 1:
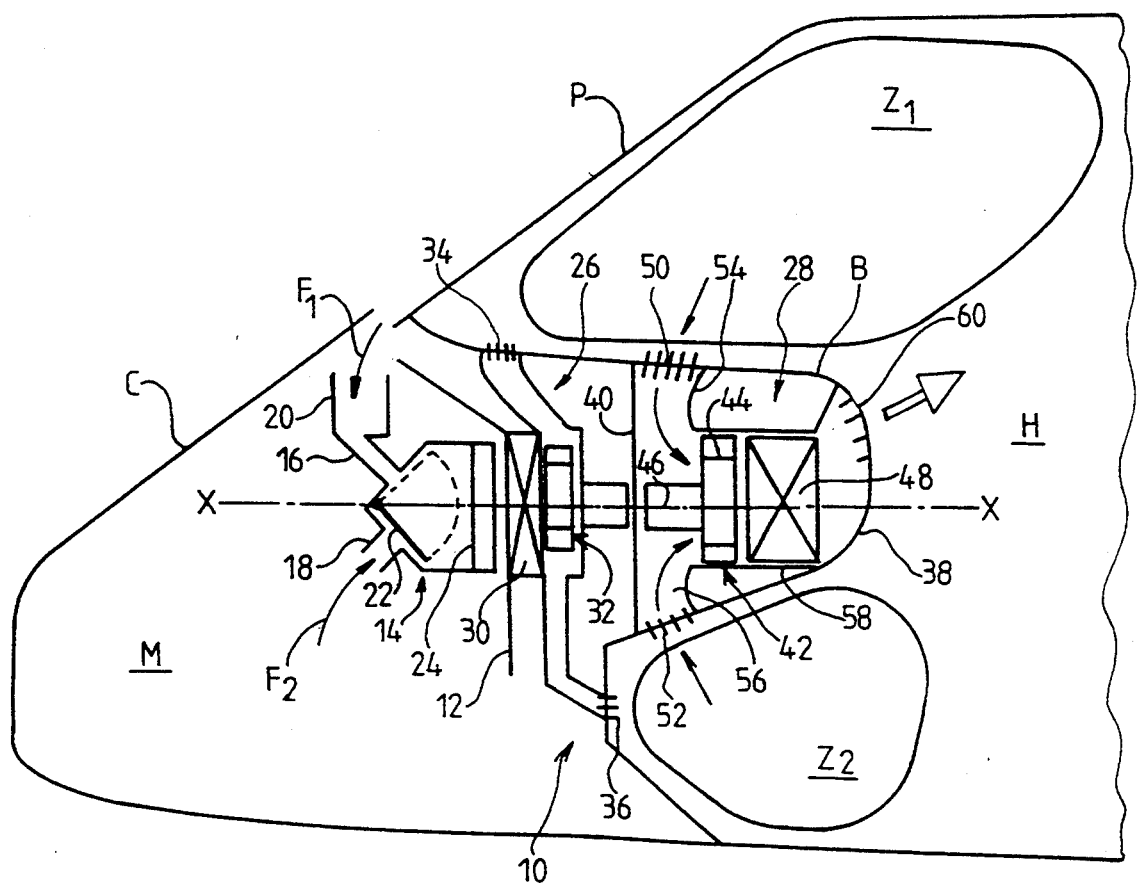
FIG. 1 is a partial view in longitudinal cross section, showing a motor vehicle of the monobody type, equipped with an installation in a first embodiment of the invention.

FIG. 1 shows an installation 10 for heating, ventilating and air conditioning a motor vehicle of the "monobody" type previously defined. The windshield P is steeply inclined and forms substantially an extension of the motor compartment hood C. The vehicle has a fascia panel B which extends over a large length (or depth) in the longitudinal direction of the vehicle, and the installation 10 is housed within the fascia panel. The vehicle has a transverse bulkhead 12 separating the cabin H from the motor compartment M at the front of the vehicle.

The installation 10 comprises an air admission member 14 situated in the motor compartment M and having a fresh air inlet 16 for admitting fresh air drawn from outside the vehicle, as indicated by the arrow F1. It also has a recirculated air inlet 18 for receiving air which is recirculated, as indicated by the arrow F2, from the cabin H of the vehicle. The fresh air inlet 16 is connected to a separator 20, the purpose of which is to separate rainwater from the fresh air drawn from outside below the windshield P.

The air admission member 14 comprises a pivoting flap valve 22 which is displaceable between two positions, namely a first position shown in full lines in FIG. 1, in which the recirculated air inlet 18 is closed, and a position shown in broken lines in FIG. 1 in which the fresh air inlet 16 is closed. The air admission member 14 is provided with a dust filter 24 which enables a stream of filtered fresh or recirculated air to be produced. This stream is then delivered through a passage in the bulkhead 12, towards other elements of the installation 10 which lie on the same side of the bulkhead as the cabin H. These other elements are arranged one behind the other in a direction which is substantially horizontal along the longitudinal axis XX of the vehicle, and are disposed centrally within the fascia panel B.

The installation 10 comprises a heating apparatus 26 for producing heated air, together with a ventilating and air conditioning apparatus 28 for producing cold or conditioned air. The heating apparatus 26 lies in front of the fascia panel B and therefore towards the front end of the vehicle, while the ventilating apparatus 28 lies towards the rear of the fascia panel B and therefore towards the rear of the vehicle.

The heating apparatus 26 is supplied with fresh air from outside the vehicle, or recirculated air from inside the vehicle, via the air admission member 14. It comprises a heating radiator 30, which may or may not be of an electrical type, together with a heater blower 32. The blower 32 delivers air, heated to a greater or lesser extent, into the cabin H via at least one deicing/demisting vent 34 directed towards the windshield, and via at least one lower vent 36 which is arranged to direct an air stream towards the lower part of the cabin H.

The ventilating and air conditioning apparatus 28 is situated within a rear part 38 of the fascia panel B. This rear part 38 is separated from the front part of the fascia panel by a bulkhead 40 which separates the heating apparatus 26 from the ventilating and air conditioning apparatus 28.

The ventilating apparatus 28 includes a ventilating blower 42 having a rotor 44 driven by a motor 46, together with an evaporator 48 which is part of a conventional refrigerating circuit. The ventilating and air conditioning apparatus 28 also has at least one upper air inlet port 50 which is arranged in the top of the fascia panel B, together with at least one lower air inlet port 52 arranged in the bottom of the fascia panel. These ports, open above and below the fascia panel respectively, are connected through ducts 54 and 56, respectively, to a casing 58 in which the blower 42 and evaporator 48 are mounted. The air which is delivered by the blower 42 (and which may if required be treated by the evaporator) is then delivered into the cabin H through at least one air vent 60 arranged on the fascia panel.

In the installation 10 shown in FIG. 1, the heating apparatus 26 enables air, heated to a greater or lesser extent, to be delivered into the cabin through the above mentioned ports 34 and 36. The apparatus 28 enables air to be aspirated in a greater or lesser degree of heating, such that it defines two zones: an upper zone Z1 situated above the fascia panel B and behind the windshield, and a lower zone Z2 situated in the lower part of the cabin H below the fascia panel B and to the rear of the motor compartment M.

Figure 2:
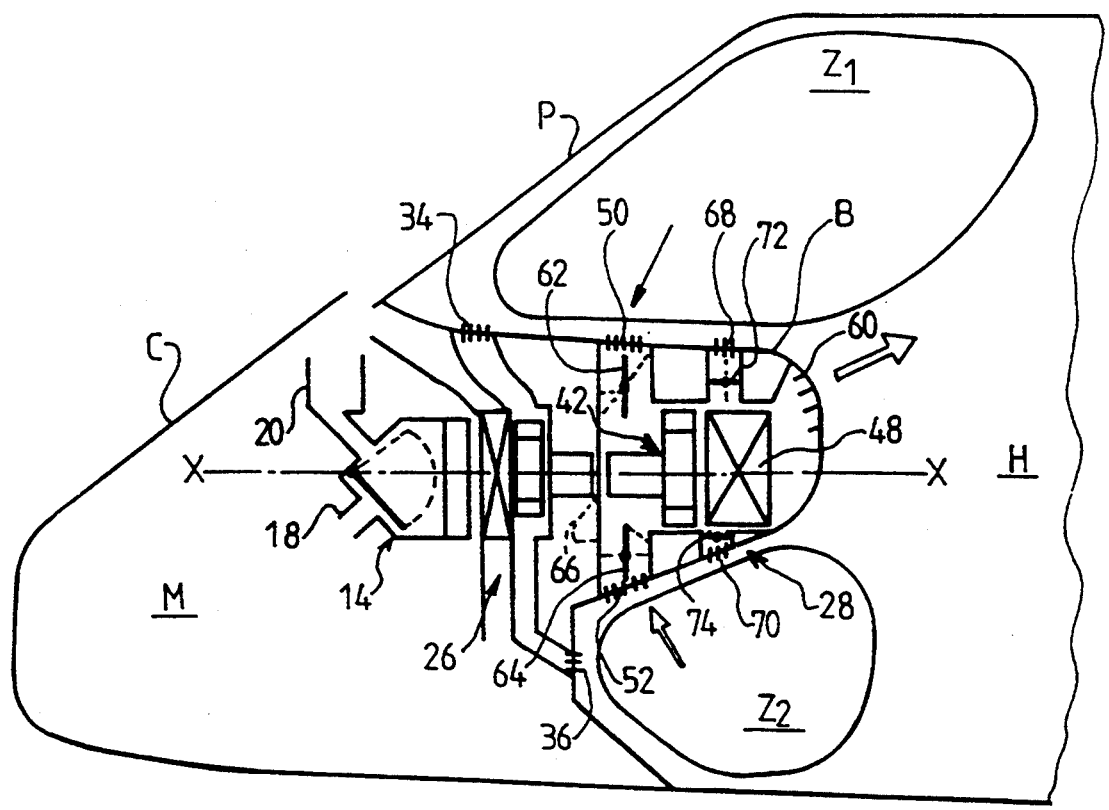
FIG. 2 is a partial view in longitudinal cross section of a motor vehicle of the monobody type equipped with an installation in a second embodiment of the invention, which is shown in a first operating position.
Figure 3:
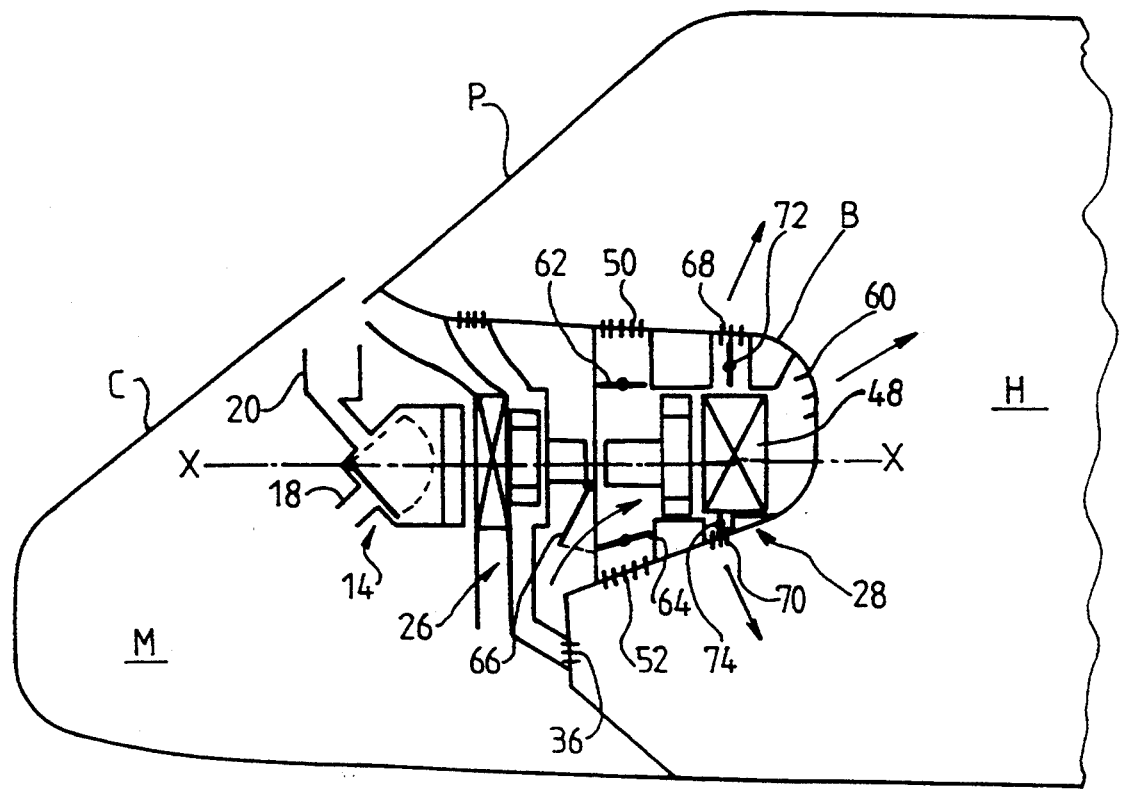
FIG. 3 is a view similar to that in FIG. 2, showing another operating position of the installation in the second embodiment of the invention.

The air in the zone Z1 is produced essentially by solar radiation through the windshield P, while the air in the zone Z2 is produced essentially by being heated by the motor which is arranged in the motor compartment M. Thus, the air which up to the present time has had a tendency to stagnate in the zones Z1 and Z2, as explained earlier herein, is here aspirated by the blower 42 through the ports 50 and 52. This air is then delivered into the cabin of the vehicle through the air vent or air vents 60 after having, optionally, been treated by the evaporator 48. All this results in improved mixing of the air in the cabin. Reference is now made to FIGS. 2 and 3. The installation shown in these Figures appears very similar to that in FIG. 1. However, the embodiment shown in FIGS. 2 and 3 differs from that shown in FIG. 1 in that the upper air inlet port 50 is controlled by a flap valve 62, while the lower air inlet port 52 is controlled by a flap valve 64. These two flap valves are synchronised in such a way that the ports 50 and 52 are open at the same time, as shown in FIG. 2, or closed at the same time as shown in FIG. 3.

The installation also includes a recirculated air inlet flap valve 66 which is arranged on the fascia panel bulkhead 40, and which communicates with the lower part of the cabin H of the vehicle. The flap valve 66 is synchronised with the upper and lower air inlet flap valves 62 and 64, in such a way that it is closed when the ports 50 and 52 are open (FIG. 2), and open when the ports 50 and 52 are closed (FIG. 3).

In addition, the ventilating and air conditioning apparatus 28 has at least one air outlet port 68 which is arranged in the upper part of the fascia panel, and another air outlet port 70 which is arranged in the lower part of the fascia panel. These ports 68 and 70 are controlled by further flap valves 72 and 74 respectively. The flap valves 72 and 74 may be controlled independently of each other, or they may be synchronised.

In the setting shown in FIG. 2, which may be called the "summer position", the air coming from the zones Z1 and Z2 is aspirated through the ports 50 and 52, the flap valves of which are open. It is then delivered by the blower 42 to the air vent or air vents 60, and to the ports 68 and 70, which can be selectively opened and closed. The evaporator is in use here, so that cold or conditioned air is delivered into the cabin so as to mix with the air already there.

In the setting shown in FIG. 3, on the other hand, which can be referred to as the intermediate season and winter position, or "fall to spring" position, the flap valve 66 is open while the flap valves 62 and 64 are closed. Only ventilation is obtained, by drawing recirculated air from the cabin H and delivering it through the air vents 60 and ports 68 and 70, the corresponding flap valves of which are open. In this way traditional ventilation is obtained with recirculated air which is not treated by the evaporator. The air from the zones Z1 and Z2 is not aspirated, thus preserving the heat in the air in the zones Z1 and Z2.

The invention is applicable preferably to vehicles of the monobody type defined above. However, the invention is of course not limited to the embodiments described by way of example above; it does extend to other embodiments. Thus, it is for example possible, if desired, to supply the ventilating and air conditioning apparatus with fresh air or recirculated air drawn from the air admission member 14.

What is claimed is:

1. An installation for heating, ventilating and air conditioning a cabin of a motor vehicle having a motor compartment, the cabin being behind the motor compartment, a windshield on the front of the cabin, and a fascia panel between the motor compartment and the cabin and extending into the latter, the installation comprising a heating apparatus and a ventilating and air conditioning apparatus both of which are contained within the fascia panel, the ventilating and air conditioning apparatus having at least one air outlet port carried on the fascia panel and communicating with the cabin, and a blower for delivering cold or conditioned air into the cabin through the said outlet port or ports, the cabin defining therein an upper zone above the fascia panel and behind the windshield, and a lower zone below the fascia panel and behind the motor compartment, wherein the ventilating and air conditioning apparatus further includes at least one upper air inlet carried by the fascia panel for receiving air from above the latter, and at least one lower air inlet carried by the fascia panel for receiving air from below the latter, and means connecting the said inlet ports to the blower so as to supply the latter with recirculated air from the said upper and lower zones of the cabin respectively.

2. An installation according to claim 1, further including a first duct connecting the or each upper air inlet port to the blower, and a second duct connecting the or each lower air inlet port to the blower.

3. An installation according to claim 1, wherein the said connecting means connect the upper and lower air inlet ports permanently to the blower.

4. An installation according to claim 1, further including a first flap valve associated with the or each upper air inlet port for controlling the degree of opening and closing of the latter, and a second flap valve associated with the lower air inlet port for controlling its degree of opening and closing.

5. An installation according to claim 4, further including means synchronising the said first and second flap valves so that the associated inlet ports are simultaneously open or closed.

6. An installation according to claim 4, further including a third flap valve, being a recirculated air inlet valve, associated with the said blower so as to supply the latter with air drawn from within the cabin of the vehicle.

7. An installation according to claim 6, wherein the said third flap valve is arranged to admit air from a lower part of the cabin.

8. An installation according to claim 6, further including means synchronising the said third flap valve with the first and second flap valves, in such a way that the third flap valve is closed when the upper and lower air inlet ports are open, and open when the said inlet ports are closed.

9. An installation according to claim 1, wherein the ventilating and air conditioning apparatus further includes at least one air vent carried by the fascia panel and arranged to direct air frontally into the cabin, at least one upper air outlet port open into the cabin in an upper part of the fascia panel, and at least one lower air outlet port carried by the fascia panel and opening into a lower part of the cabin, and means putting the said air vent or vents and outlet ports in communication with the said blower.

10. An installation according to claim 9, further including fourth flap valves associated with the said upper and lower air outlet ports respectively, for controlling the degree of opening and closing of the latter.

11. An installation according to claim 1, wherein the heating apparatus has an air inlet for admitting cold or recirculated air, a heater blower receiving air therefrom, and further air outlet ports separate from those of the ventilating and air conditioning apparatus, for receiving air from the blower.

12. An installation according to claim 1, wherein the vehicle defines a longitudinal axis of the vehicle, the heating apparatus being aligned with the ventilating and air conditioning apparatus in a direction substantially horizontal with reference to the said axis, the heating apparatus being in front of the ventilating and air conditioning apparatus.

* * * * *